United States Patent [19]

Tamagawa

[11] Patent Number: 5,339,236
[45] Date of Patent: Aug. 16, 1994

[54] CHARGE PUMP CIRCUIT FOR INTERMEDIATE VOLTAGE BETWEEN POWER SUPPLY VOLTAGE AND ITS DOUBLE VOLTAGE

[75] Inventor: Akio Tamagawa, Tokyo, Japan
[73] Assignee: NEC Corporation, Tokyo, Japan
[21] Appl. No.: 21,809
[22] Filed: Feb. 24, 1993
[30] Foreign Application Priority Data
Mar. 23, 1992 [JP] Japan .................................. 4-064416
[51] Int. Cl.$^5$ .............................................. H02M 3/07
[52] U.S. Cl. ......................................... 363/59; 363/60
[58] Field of Search ............... 363/59, 60; H02M 3/07
[56] References Cited
U.S. PATENT DOCUMENTS

| | | | |
|---|---|---|---|
| 4,807,104 | 2/1989 | Floyd et al. | 363/59 |
| 4,812,961 | 3/1989 | Essaff et al. | 363/61 |
| 4,999,761 | 3/1991 | Bingham et al. | 363/60 |
| 5,066,871 | 11/1991 | Wilcox | 363/60 |

FOREIGN PATENT DOCUMENTS 4-71364   3/1992   Japan ........................... H02M 3/07

*Primary Examiner*—Jeffrey L. Sterrett

[57] ABSTRACT

A charge pump circuit includes a charge supplying capacitor, a constant voltage circuit such as a diode, and first and second switches serially arranged between a power supply terminal $V_{DD}$ and a ground terminal. When the first and second switches are turned ON, a voltage across the charge supplying capacitor is $V_{DD} - \Delta V$, where $\Delta V$ is a level shift amount produced by the constant voltage circuit. Also, the charge supplying capacitor is associated with third and fourth switches and they are serially arranged between the ground terminal and an output terminal. When the third and fourth switches are turned ON, the voltage across the charge supplying capacitor plus $V_{DD}$, i.e., $2 V_{DD} - \Delta V$, is transferred to the output terminal.

24 Claims, 11 Drawing Sheets

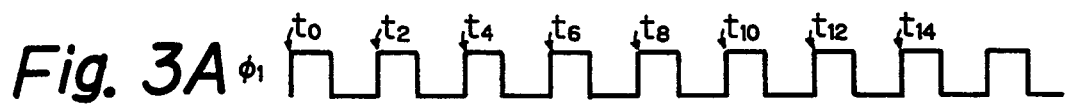
Fig. 3A $\phi_1$
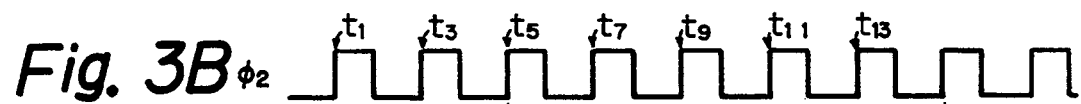
Fig. 3B $\phi_2$
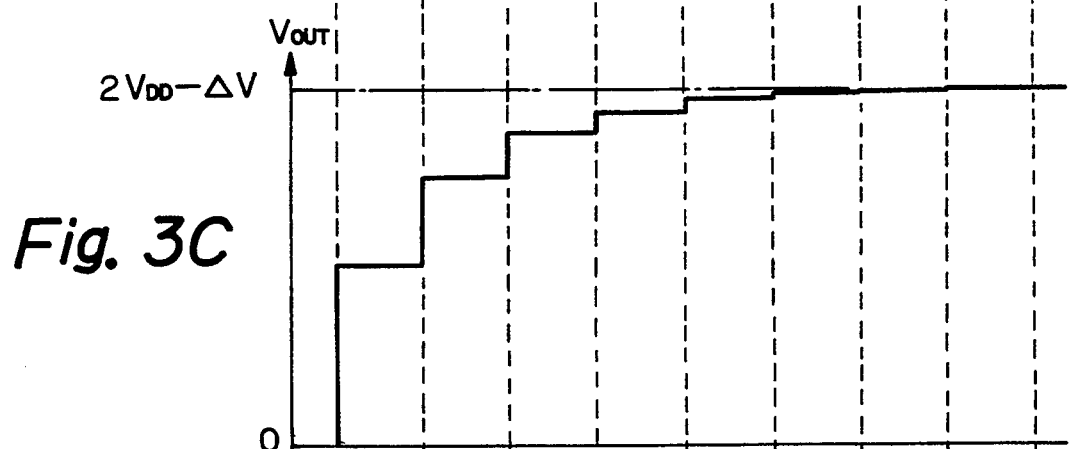
Fig. 3C
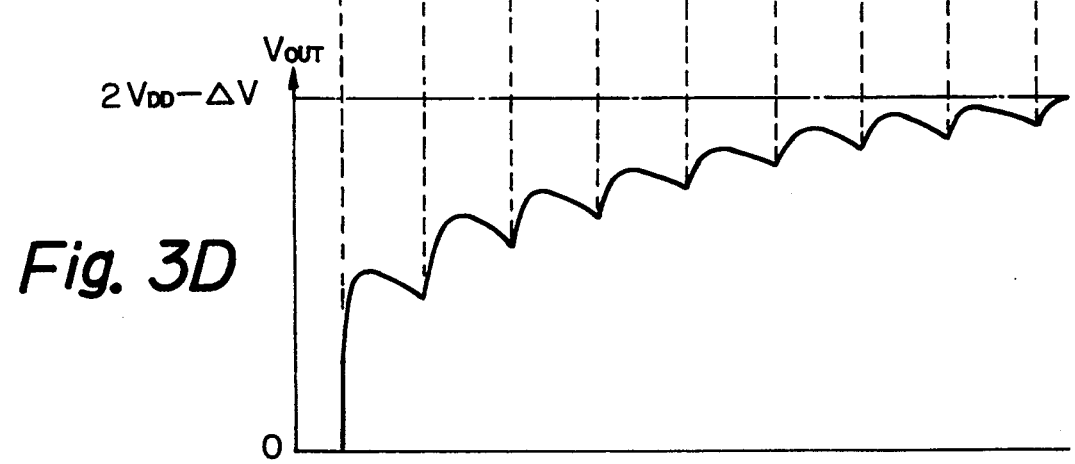
Fig. 3D

*Fig. 5A*  *Fig. 5B*  *Fig. 5C*  *Fig. 5D*
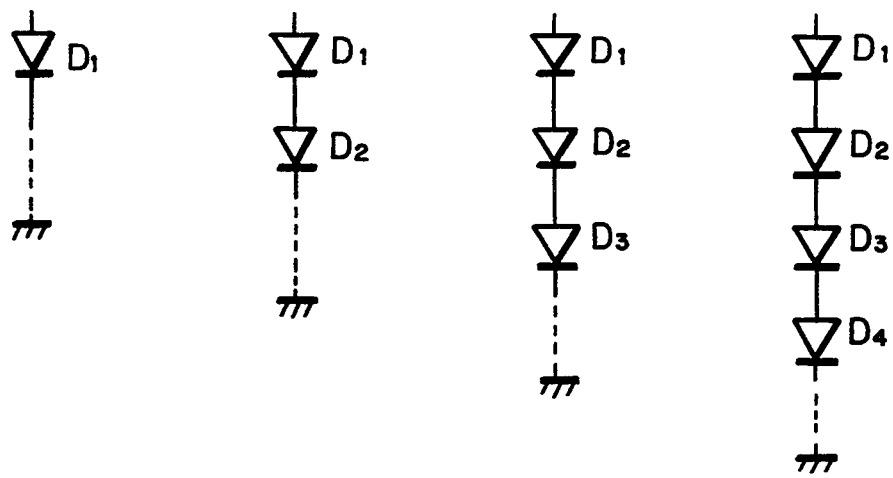
*Fig. 5E*  *Fig. 5F*  *Fig. 5G*  *Fig. 5H*
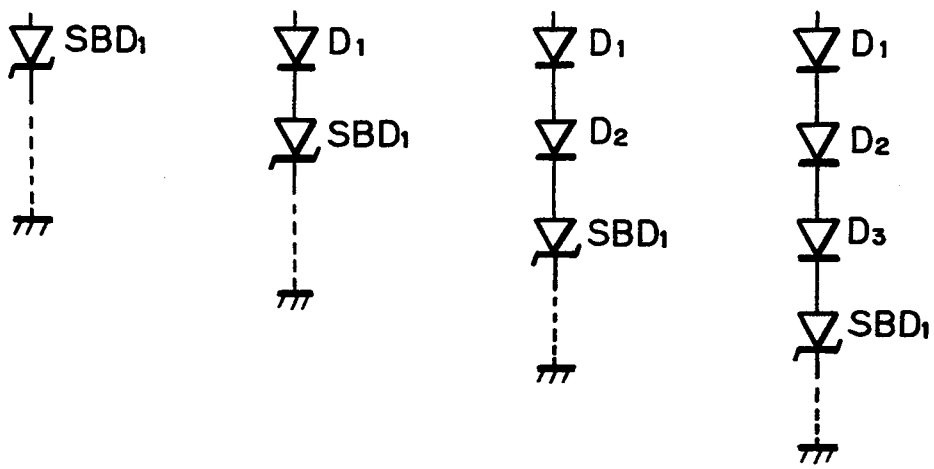

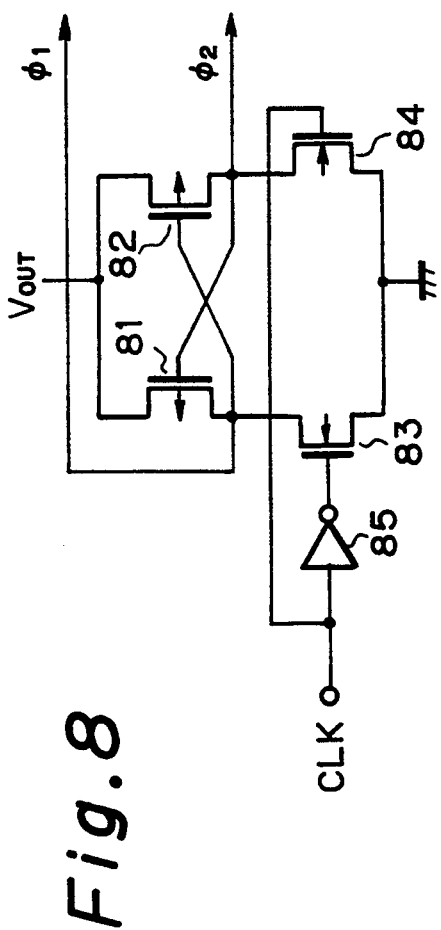
Fig. 8
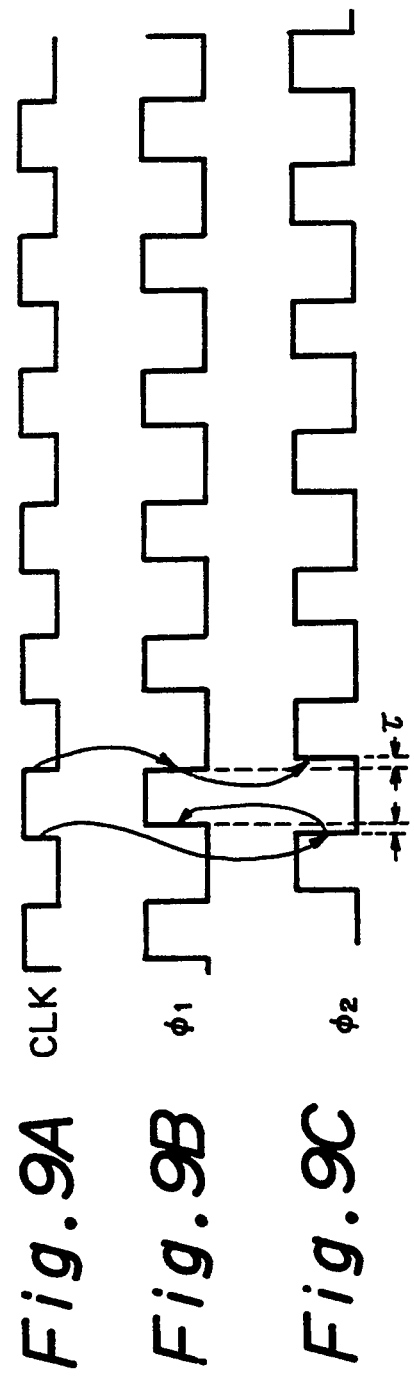
Fig. 9A
Fig. 9B
Fig. 9C

Fig. 11A CLK
Fig. 11B Q
Fig. 11C Q̄ (D)
Fig. 11D φ₁
Fig. 11E φ₂

CHARGE PUMP CIRCUIT FOR INTERMEDIATE VOLTAGE BETWEEN POWER SUPPLY VOLTAGE AND ITS DOUBLE VOLTAGE

BACKGROUND OF THE INVENTION

1. Field of the Invention

The present invention relates to a charge pump circuit for generating an intermediate voltage between a power supply voltage and its double voltage.

2. Description of the Related Art

Recently, portable telephones, portable television game apparatuses and the like have been developed, and also, electronic apparatuses therefor have to be reduced in size and the power consumption thereof has to be reduced.

Generally, in a semiconductor integrated circuit consisting such an electronic apparatus, a single power supply voltage such as 5 V is used, and if a voltage higher than 5 V is required to drive a liquid crystal display panel or the like, a charge pump circuit as a step-up circuit is incorporated into the semiconductor integrated circuit. Note that a liquid crystal display panel requires a driving voltage of 6 V to 9 V dependent on the temperature thereof affecting the contrast of the display.

A prior art charge pump circuit is a switched capacitor type which includes two capacitors and four switches for charging the two capacitors using a single power supply voltage $V_{DD}$ to generate its double voltage $2 V_{DD}$ (see: U.S. Pat. No. 4,807,104). In this prior art charge pump circuit, if an intermediate voltage between the power supply voltage $V_{DD}$ and its double voltage $2 V_{DD}$, an additional circuit including an operational amplifier is provided in the last stage of the charge pump circuit. This will be explained in more detail later.

In the above-mentioned charge pump circuit including the additional operational amplifier for an intermediate voltage, however, a large amount of power is consumed by the additional operational amplifier.

SUMMARY OF THE INVENTION

It is an object of the present invention to reduce the power consumption of a charge pump circuit for generating an intermediate voltage between a power supply voltage $V_{DD}$ and its double voltage $2 V_{DD}$.

According to the present invention, a charge pump circuit includes a charge supplying capacitor, a constant voltage circuit such as a diode, and first and second switches serially arranged between a power supply terminal $V_{DD}$ and a ground terminal. When the first and second switches are turned ON, a voltage across the charge supplying capacitor is $V_{DD} - \Delta V$, where $\Delta V$ is an amount of level shift produced by the constant voltage circuit. Also, the charge supplying capacitor is associated with third and fourth switches and are serially arranged between the ground terminal and an output terminal. When the third and fourth switches are turned ON, the voltage across the charge supplying capacitor plus $V_{DD}$, i.e., $2 V_{DD} - \Delta V$, is transferred to the output terminal.

BRIEF DESCRIPTION OF THE DRAWINGS

The present invention will be more clearly understood from the description as set forth below, compared with the prior art, with reference to the accompanying drawings, wherein:

FIGS. 3A, through 3D are timing diagrams showing the operation of the charge pump circuits of FIGS. 2A through 2D;

FIGS. 5A through 5H, FIGS. 6A through 6H, and FIG. 7A and 7B are detailed circuit diagrams of the constant voltage circuits of FIGS. 2A through 2D and FIGS. 4A through 4D;

FIG. 8 is a circuit diagram illustrating a clock generating circuit applied to the charge pump circuits of FIGS. 2A through 2D and FIGS. 4A through 4D; and FIGS. 9A, 9B, and 9C are timing diagram showing the operation of the circuit of FIG. 8.

FIGS. 11A, 11B, 11C, 11D, and 11E are timing diagram showing the operation of the circuit of FIG. 10.

DESCRIPTION OF THE PREFERRED EMBODIMENTS

Before giving a description of the embodiments of the present invention, a prior art charge pump circuit including an additional circuit for generating an intermediate voltage between a power supply voltage $V_{DD}$ and a ground voltage will be explained with reference to FIG. 1.

Figure 1:
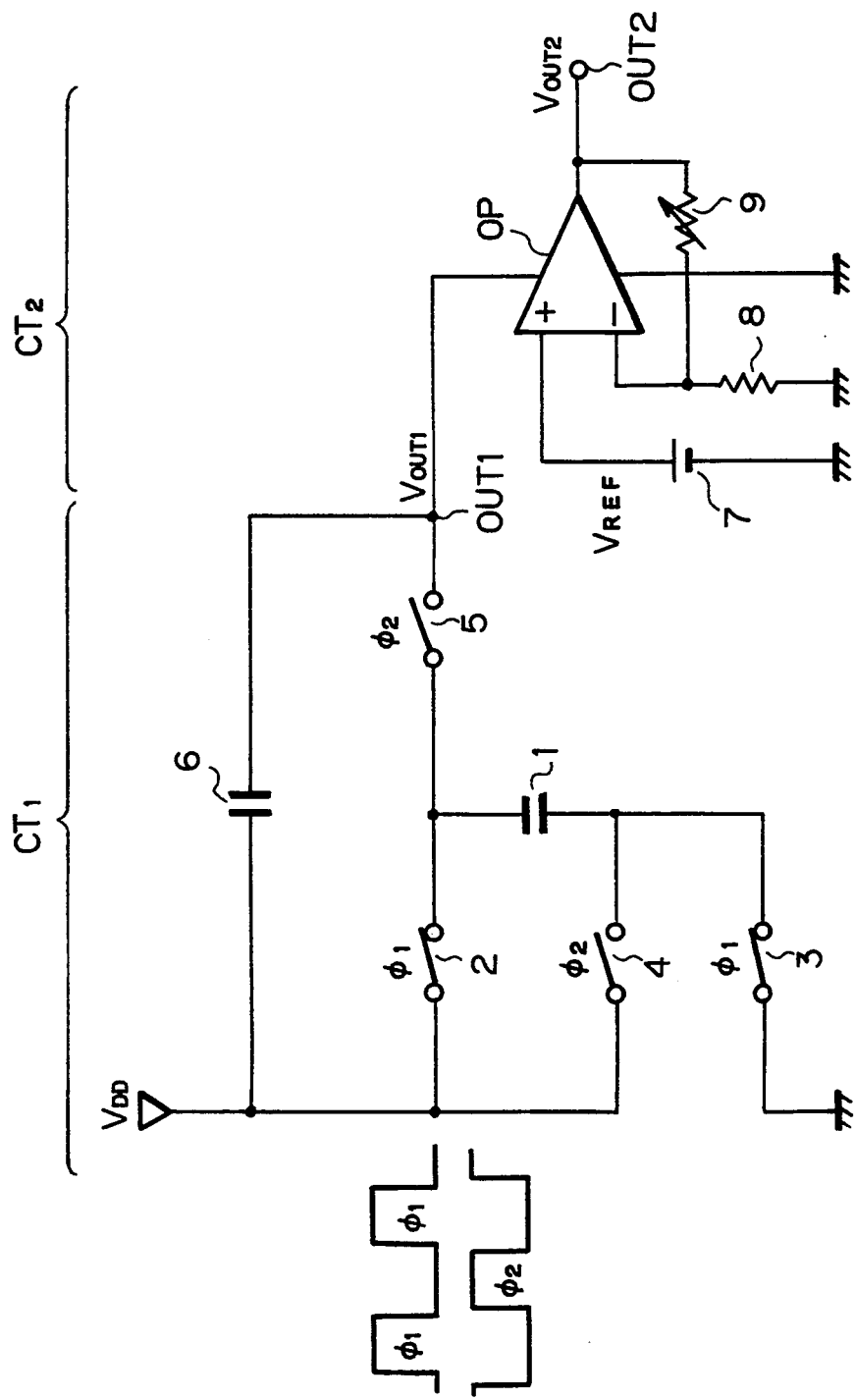
FIG. 1 is a circuit diagram illustrating a prior art charge pump circuit including an additional circuit for generating an intermediate voltage between $V_{DD}$ and $2 V_{DD}$.

In FIG. 1, $CT_1$ is a charge pump circuit for generating a double voltage $2 V_{DD}$ of a power supply voltage $V_{DD}$, and $CT_2$ is a noninverting amplifier for generating an intermediate voltage $V_{OUT2}$ between the power supply voltage $V_{DD}$ and its double voltage $2 V_{DD}$.

In more detail, the charge pump circuit $CT_1$ includes a charge supplying capacitor 1 and two switches 2 and 3 which serially connect the charge supplying capacitor 1 to a power supply terminal ($V_{DD}$) and a ground terminal (GND), respectively. In this case, the switches 2 and 3 are controlled by a clock signal $\phi_1$, i.e., both of the switches 2 and 3 are turned ON and OFF when the clock signal $\phi_1$ is active and inactive, respectively. Also, the charge pump circuit $CT_1$ includes two switches 4 and 5 which serially connect the charge supplying capacitor 1 to the ground terminal and the output terminal OUT1, respectively. In this case, the switches 4 and 5 are controlled by a clock signal $\phi_2$ which is opposite in phase to the clock signal $\phi_1$, i.e., both of the switches 4 and 5 are turned ON and OFF when the clock signal $\phi_2$ is active and inactive, respectively. Reference numeral 6 designates a smoothing capacitor connected between the power supply terminal and the output terminal OUT1.

When the switches 2 and 3 are turned ON (closed), the charge supplying capacitor 1 is charged to $V_{DD}$. Thereafter, when the switches 2 and 3 are turned OFF (opened), and therefore, the switches 4 and 5 are turned ON (closed), the voltage $V_{DD}$ across the charge supplying capacitor 1 plus the voltage $V_{DD}$ at the power supply terminal is transferred to the output terminal OUT1, and thus, the voltage $V_{OUT1}$ is at the output terminal OUT1 becomes at 2 $V_{DD}$, which is applied as a power supply voltage to the noninverting amplifier $CT_2$.

The noninverting amplifier $CT_2$ includes an operational amplifier OP which is powered (biased) by the voltage 2 $V_{DD}$, a reference voltage source 7, a resistor 8 and a variable feedback resistor 9. In this noninverting amplifier $CT_2$, the gain A is given by:

$$A = 1 + R2/R1$$

where R1 and R2 are resistance values of the resistors 8 and 9, respectively. Therefore, if A is a value between 1.0 and 2.0, an output voltage $V_{OUT2}$ at an output terminal OUT2 of the noninverting amplifier $CT_2$ is $$(1 + R2/R1) \cdot V_{REF}$$

where $V_{REF}$ is a voltage of the reference voltage source 7. In this case, the output voltage $V_{OUT2}$ can be an intermediate voltage between $V_{DD}$ and 2 $V_{DD}$.

In the noninverting amplifier $CT_2$, however, an excess bias current flows from a power supply having a pulled-up voltage 2 $V_{DD}$ through the operational amplifier 6, and in addition, an excess current flows through the feedback resistor 9, thus increasing the power consumption.

Particularly, since the above-mentioned excess currents of the operational amplifier OP is based on the power voltage 2 $V_{DD}$, this bias current is twice that par the power voltage $V_{DD}$, which is disadvantageous in a battery driven system. For example, if $V_{DD}=5$ V, $R1=50$ kΩ, and $R2=25$ kΩ, then $A=1+25/50=1.5$, and therefore, the output voltage $V_{OUT2}$ is 5.0 V$\times 1.5=7.5$ V. In this case, a direct current of 7.5 V/(50 kΩ+25 kΩ) (=0.1 mA) flows through the feedback resistor 9. This current corresponds to 0.2 mA in the case of a power supply voltage 5 V. Further, in this case, several hundred μA as a bias current flows through the operational amplifier OP.

Figure 2A:
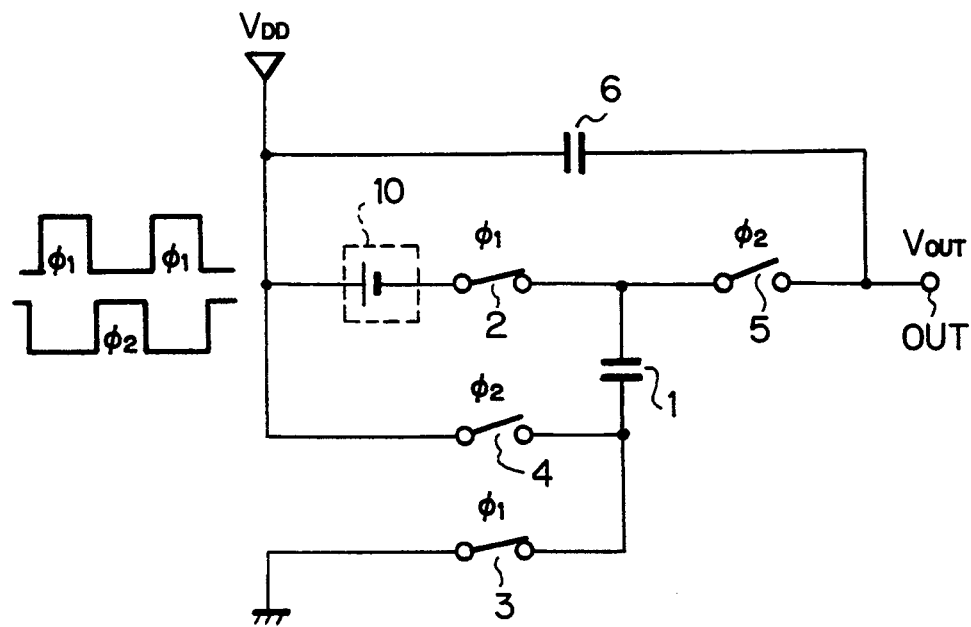
FIGS. 2A, 2B, 2C, and 2D are circuit diagrams illustrating first, second, third, and fourth embodiments of the charge pump circuit for generating an intermediate voltage between $V_{DD}$ and $2 V_{DD}$ according to the present invention.

In FIG. 2A, which illustrates a first embodiment of the present invention, a charge pump circuit without the above-mentioned noninverting amplifier of FIG. 1 is capable of generating an intermediate voltage between the power supply voltage $V_{DD}$ and its double voltage 2 $V_{DD}$. In the charge pump circuit of FIG. 2A, a constant voltage circuit 10 is added between the power supply terminal ($V_{DD}$) and the switch 2. As a result, when the switches 2 and 3 are turned On by the active clock signal $\phi_1$ and the switches 4 and 5 are turned OFF by the inactive clock signal $\phi_2$, the charge supply capacitor 1 is charged so that a voltage across the charge supply capacitor 1 becomes $V_{DD} - \Delta$ V where $\Delta$ V is a level shift amount (i.e., a voltage drop) produced by the constant voltage circuit 10. Thereafter, when the switches 2 and 3 are turned OFF by the inactive clock signal $\phi_1$ and the switches 4 and 5 are turned On by the active clock signal $\phi_2$, the potential at a terminal between the charge supplying capacitor 1 and the switch 4 is pulled up from the ground voltage to the power supply voltage $V_{DD}$, and as a result, the potential at a terminal between the charge supplying capacitor 1 and the switch 5, i.e., the potential $V_{OUT}$ at the output terminal OUT is pulled up from $V_{DD} - \Delta$ V to $V_{DD} - \Delta$ V$+V_{DD}$(=2 $V_{DD} - \Delta$ V). In this case, note that the clock signal $\phi_2$ becomes active a little while after the clock signal $\phi_1$ becomes inactive, thus avoiding a short-circuit between the power supply terminal ($V_{DD}$) and the ground terminal.

Figure 2B:
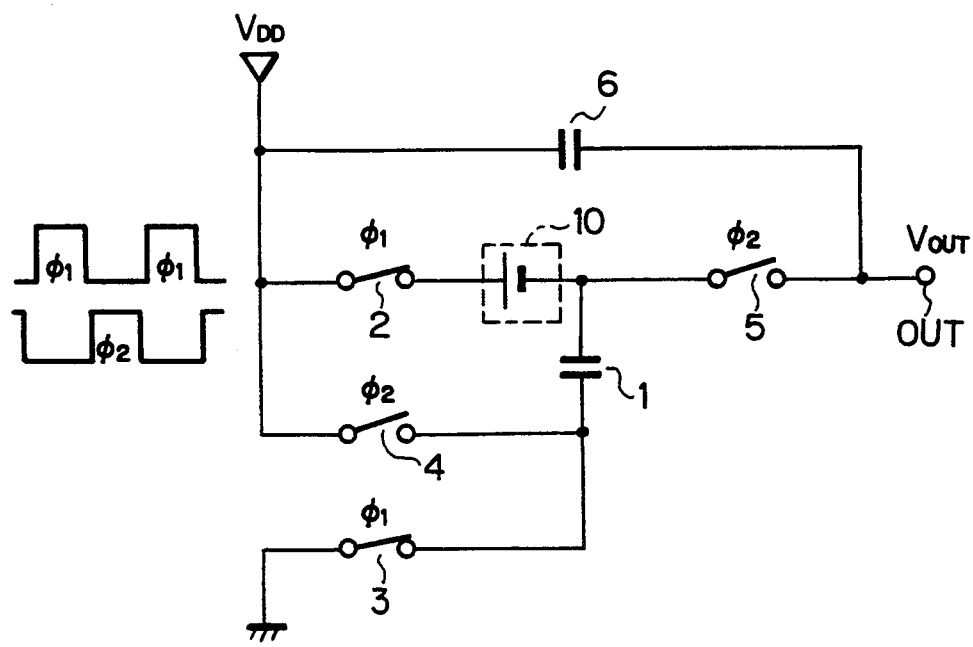
Figure 2C:
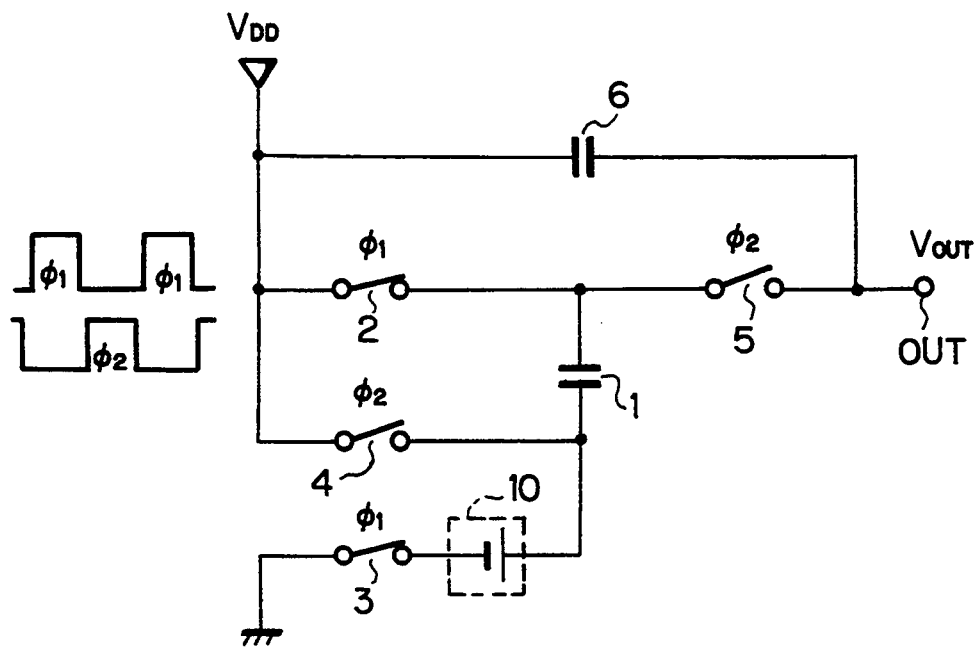
Figure 2D:
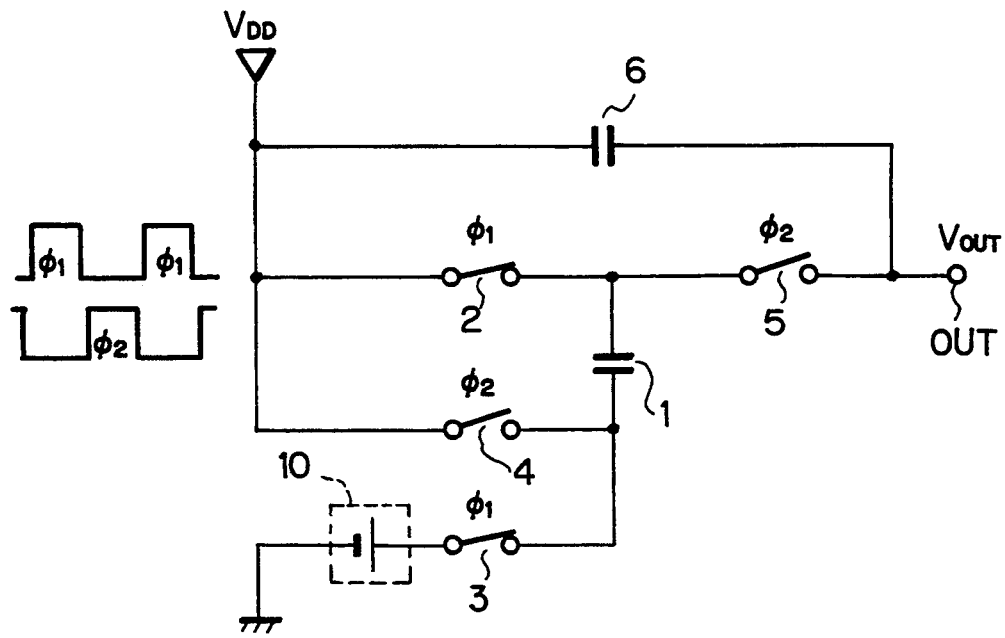
Figure 4A:
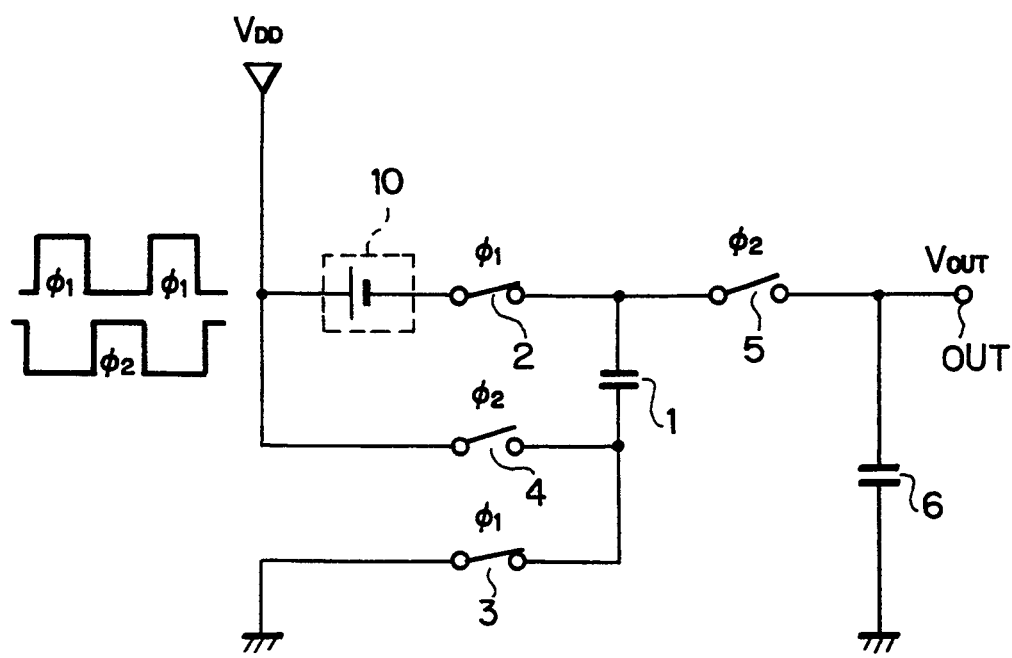
FIGS. 4A, 4B, 4C, and 4D are circuit diagrams illustrating fifth, sixth, seventh, and eighth embodiments of the charge pump circuit for generating an intermediate voltage between $V_{DD}$ and $2 V_{DD}$ according to the present invention.
Figure 4B:
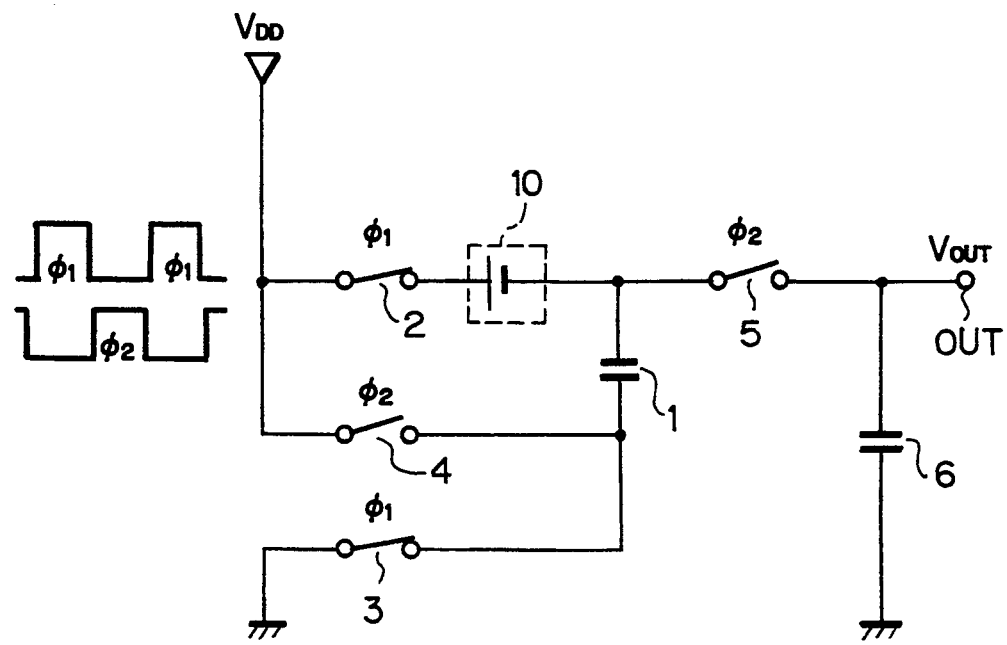
Figure 4C:
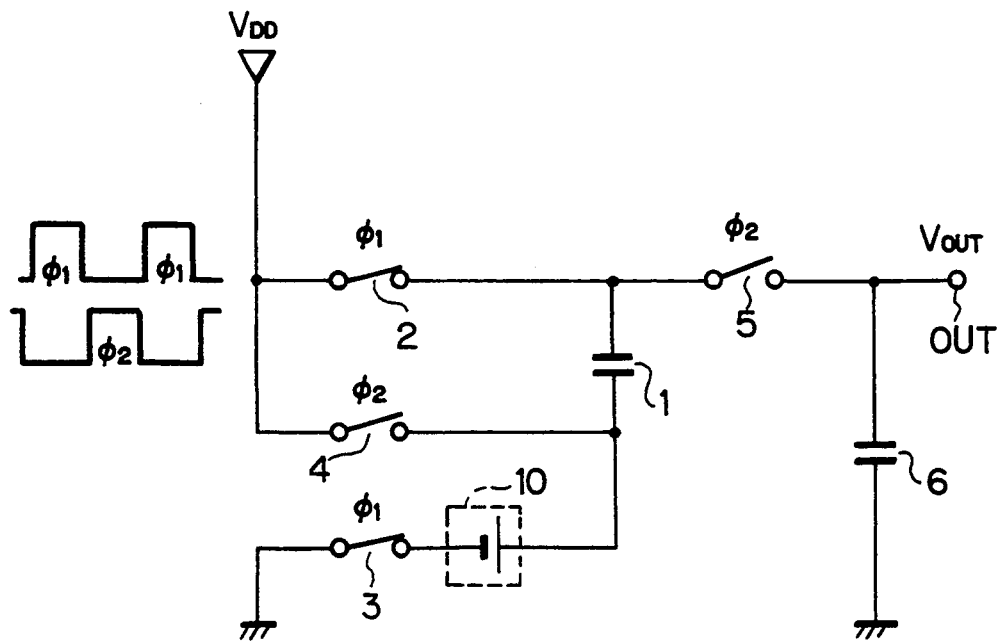
Figure 4D:
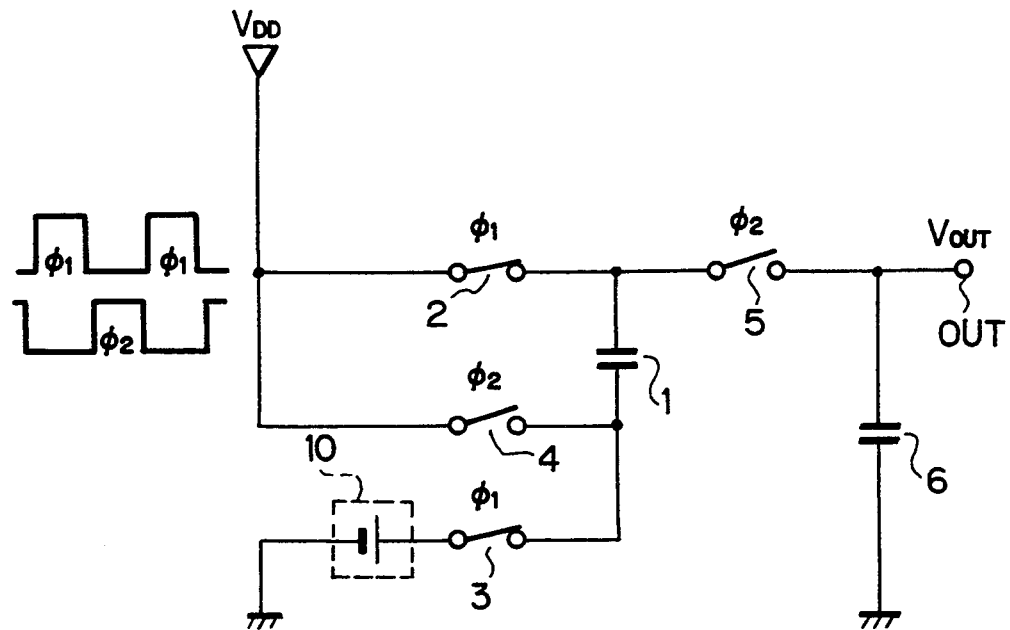

In FIG. 2B, which illustrates a second embodiment of the present invention, the constant voltage circuit 10 is interposed between the switch 2 and the charge supply capacitor 1. Also, in FIG. 2C, which illustrates a third embodiment of the present invention, the constant voltage circuit 10 is interposed between the charge supply capacitor 1 and the switch 3. Further, in FIG. 2D, which illustrates a fourth embodiment of the present invention, the constant voltage circuit 10 is interposed between the switch 3 and the ground terminal. The operation of the circuits as illustrated in FIGS. 2B, 2C, and 2D is the same as that of the circuit of FIG. 2A, which will be explained in detail with reference to FIGS. 3A, 3B, 3C, and 3D.

As shown in FIGS. 3A and 3B, the clock signals $\phi_1$ and $\phi_2$ are changed in opposite phase to each other, and in this case, the clock signals $\phi_1$ and $\phi_2$ are not simultaneously active.

Assume that the output terminal OUT is open, i.e., no load is connected thereto, then, the voltage $V_{OUT}$ at the output terminal OUT is changed as shown in FIG. 3C. That is, when the power (not shown) is turned ON to increase the voltage $V_{DD}$, at time $t_0$, the voltage across the charge supplying capacitor 1 is $V_{DD} - \Delta$ V due to the closing of the switches 2 and 3, but, the voltage $V_{OUT}$ remains at 0V. Then, after the switches 2 and 3 are opened, at time $t_1$, the switches 4 and 5 are closed, and as a result, the voltage $V_{OUT}$ becomes:

$$(2V_{DD} - \Delta V) \frac{C_2}{C_1 + C_2}$$

where $C_1$ is the capacity of the charge supply capacitor 1, and $C_2$ is the capacity of the smoothing capacitor 6. For example, if $C_1$ equals $C_2$, then, $V_{OUT}$ equals (2 $V_{DD} - \Delta$ V)/2. Similarly, at time $t_3$, the voltage $V_{OUT}$ becomes:

$$(2V_{DD} - \Delta V)/2 + (2V_{DD} - \Delta V)/4 = (2V_{DD} - \Delta V) \cdot \tfrac{3}{4}$$

Thus, the voltage $V_{OUT}$ finally reaches:

$$(2V_{DD} - \Delta V) \times (\tfrac{1}{2} + \tfrac{1}{4} + \tfrac{1}{8} + \ldots) = 2V_{DD} - \Delta V.$$

Next, assume that an appropriate load having a resistance value $\gamma$ is connected to the output terminal OUT, then, the voltage $V_{OUT}$ at the output terminal OUT is changed as shown in FIG. 3D. That is, when the power (not shown) is turned ON to increase the voltage $V_{DD}$, at time $t_0$, the voltage across the charge supplying capacitor 1 is also $V_{DD} - \Delta$ V due to the closing of the switches 2 and 3, and the voltage $V_{OUT}$ remains at 0V. Then, after the switches 2 and 3 are opened, at time $t_1$, the switches 4 and 5 are closed, and as a result, the voltage $V_{OUT}$ approaches (2 $V_{DD} - \Delta$ V)/2, however, due to the presence of the load, a current flows from the output terminal OUT to the load, and therefore, a ripple occurs a shown in FIG. 3D. Thus, the voltage $V_{OUT}$ finally approaches 2 $V_{DD} - \Delta$ V with a ripple dependent on the resistance value $\gamma$ of the load and the capacity $C_2$ of the smoothing capacitor 6. In this case, the smaller the resistance value of the load, the larger the ripple. Also, the smaller the capacity $C_2$ of the smoothing capacitor 6, the larger the ripple.

In FIGS. 4A, 4B, 4C, and 4D, which illustrate fifth, sixth, seventh, and eighth embodiments, respectively, of the present invention, the first, second, third, and fourth embodiments as illustrated in FIGS. 2A, 2B, 2C, and 2D are modified. That is, the smoothing capacitor 6 is interposed between the output terminal OUT and the ground terminal. Also, the operation of the circuits of FIGS. 4A, 4B, 4C, and 4D is the same as that of the circuits of FIGS. 2A, 2B, 2C, and 2D, although rise characteristics of the output voltage $V_{OUT}$ immediately after power-on deteriorate as compared with the first to fourth embodiments.

Next, the constant voltage circuit 10 of FIGS. 2A, 2B, 2C, and 2D and FIGS. 4A, 4B, 4C, and 4D will be explained with reference to FIGS. 5A through 5H, FIGS. 6A through 6H, and FIGS. 7A, 7B, and 7C.

As illustrated in FIGS. 5A, 5B, 5C, and 5D, the constant voltage circuit 10 includes one or more PN junction diodes, $D_1$, $D_2$, $D_3$, and $D_4$ each of which has a constant level shift amount such as 0.4 V. That is, in FIG. 5A, the level shift amount $\Delta V$ produced by the constant voltage circuit 10 is 0.4 V. In FIG. 5B, the level shift amount $\Delta V$ produced by the constant voltage circuit 10 is 0.4 V×2=0.8 V. In FIG. 5C, the level shift amount $\Delta V$ produced by the constant voltage circuit 10 is 0.4 V×3=1.2 V. In FIG. 5D, the level shift amount 0.4 V×4=1.6 V. Note that the constant voltage circuit 10 can be formed by an arbitrary number of PN junction diodes.

As illustrated in FIGS. 5E, 5F, 5G, and 5H, the constant voltage circuit 10 includes a schottky diode $SBD_1$ which as a constant level shift amount such as 0.3 V. That is, in FIG. 5E, the level shift amount $\Delta V$ produced by the constant voltage circuit 10 is 0.3 V. In FIG. 5F, the level shift amount $\Delta V$ produced by the constant voltage circuit 10 is 0.4 V+0.3 V=0.7 V. In FIG. 5C, the level shift amount $\Delta V$ produced by the constant voltage circuit 10 is 0.4 V×2+0.3 V=1.1 V. In FIG. 5H, the level shift amount $\Delta V$ produced by the constant voltage circuit 10 is 0.4 V×3+0.3 V=1.5 V. Note that the constant voltage circuit 10 can be formed by an arbitrary number of schottky diodes, and also can be formed by a combination of one or more PN junction diodes and one or more schottky diodes.

Figure 6A:
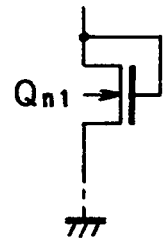
Figure 6B:
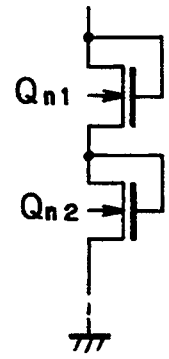
Figure 6C:
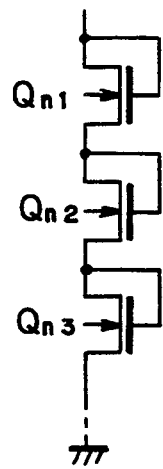
Figure 6D:
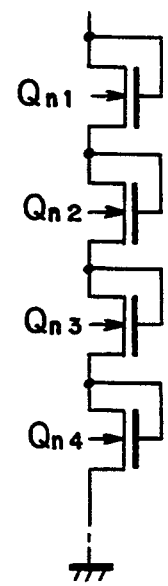
Figure 6E:
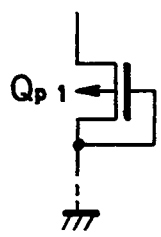

As illustrated in FIGS. 6A, 6B, 6C, and 6D, the constant voltage circuit 10 includes one or more gate-drain-connected N-channel enhancement type MOS (broadly, MIS) transistors, $Q_{n1}$, $Q_{n2}$, $Q_{n3}$, and $Q_{n4}$ each of which has a constant level shift amount, i.e., a threshold voltage such as 0.7 V. That is, in FIG. 6A, the level shift amount $\Delta V$ produced by the constant voltage circuit 10 is 0.7 V. In FIG. 6B, the level shift amount $\Delta V$ produced by the constant voltage circuit 10 is 0.7 V×2=1.4 V. In FIG. 6C, the level shift amount $\Delta V$ produced by the constant voltage circuit 10 is 0.7 V×3=2.1 V. In FIG. 6D, the level shift amount $\Delta V$ produced by the constant voltage circuit 10 is 0.7 V×4=2.8 V. Note that the constant voltage circuit 10 can be formed by an arbitrary number of N-channel enhancement type MOS transistors and also can be formed by a combination of one or more PN junction diodes, one or more schottky diodes, and one or more N-channel enhancement type MOS transistors.

Figure 6F:
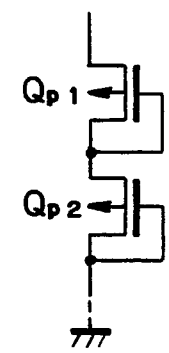
Figure 6G:
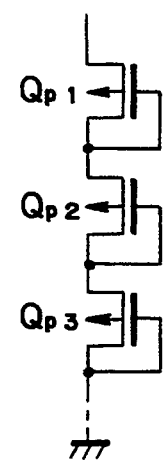
Figure 6H:
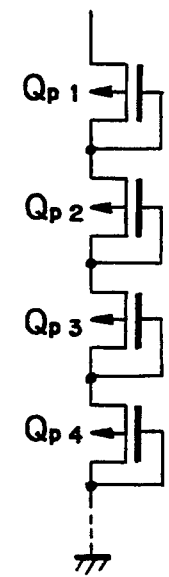

As illustrated in FIGS. 6E, 6F, 6G, and 6H, the constant voltage circuit 10 includes one or more gate-drain-connected P-channel enhancement type MOS transistors $Q_{p1}$, $Q_{p2}$, $Q_{p3}$, and $Q_{p4}$ each of which has a constant level shift amount, i.e., a threshold voltage such as −0.7 V. That is, in FIG. 6E, the level shift amount $\Delta V$ produced by the constant voltage circuit 10 is 0.7 V. In FIG. 6F, the level shift amount $\Delta V$ produced by the constant voltage circuit 10 is 0.7 V×2=1.4 V. In FIG. 6C, the level shift amount $\Delta V$ produced by the constant voltage circuit 10 is 0.7 V×3=2.1 V. In FIG. 6H, the level shift amount $\Delta V$ produced by the constant voltage circuit 10 is 0.7 V×4=2.8 V. Note that the constant voltage circuit 10 can be formed by an arbitrary number of P-channel enhancement type MOS transistors and also can be formed by a combination of one or more PN junction diodes, one or more schottky diodes, and one or more P-channel enhancement type MOS transistors.

Figure 7A:
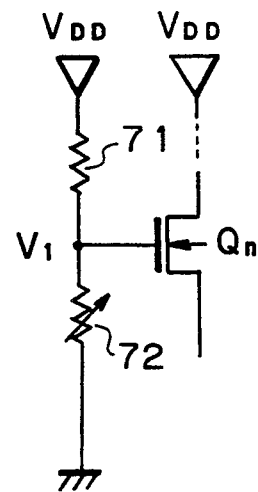

As illustrated in FIG. 7A, the constant voltage circuit 10 includes a source follower formed by an N-channel enhancement type MOS transistor $Q_n$ whose gate potential is controlled by a voltage divider formed by resistors 71 and 72. Note that this constant voltage circuit 10 as illustrated in FIG. 7A is applied to only the circuits of FIGS. 2A, 2B, 4A, and 4B. When the switches 2 and 3 (FIGS. 2A, 2B, 4A, and 4B) are turned ON, the level shift amount $\Delta V$ produced by the source follower $Q_n$, i.e., the drain-source voltage thereof, is $$\Delta V = V_{DD} - V_1 + V_{thn}$$

where $V_1$ is an output voltage of the voltage divider (71,72), and $V_{thn}$ is a threshold voltage of the N-channel enhancement type MOS transistor $Q_n$. Therefore, the voltage across the charge supplying capacitor 1 is $V_1 - V_{thn}$. Thus, the output voltage $V_{OUT}$ is $V_{DD} + V_1 - V_{thn}$. For example, if $V_{DD} = 5.0$ V, $V_1 = 3.7$ V, $V_{thn} = 0.7$ V, then the output voltage $V_{OUT}$ is 8.0 V. Note that the voltage $V_1$ is changed by changing the value of the variable resistor 72, and therefore, the output voltage $V_{OUT}$ can be an arbitrary voltage between $V_{DD}$ and 2 $V_{DD}$.

Figure 7B:
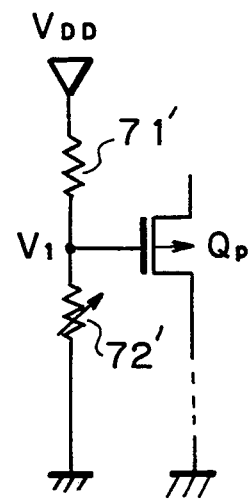

Similarly, as illustrated in FIG. 7B, the constant voltage circuit 10 includes a source follower formed by a P-channel enhancement type MOS transistor $Q_P$ whose gate potential is controlled by a voltage divider formed by resistors 71' and 72'. Note that this constant voltage circuit 10 as illustrated in FIG. 7B is applied to only the circuits of FIGS. 2C, 2D, 4C, and 4D. When the switches 2 and 3 (FIGS. 2A, 2B, 4A, and 4B) are turned ON, the level shift amount $\Delta V$ produced by the source follower $Q_P$, i.e., the drain-source voltage thereof, is $$\Delta V = -V_1 - |V_{thP}|$$

where $V_1$ is an output voltage of the voltage divider (71',72'), and $V_{thP}$ is a threshold voltage of the P-channel enhancement type MOS transistor $Q_P$. Therefore, the voltage across the charge supplying capacitor 1 is $V_{DD} - V_1 - |V_{thP}|$. Thus, the output voltage $V_{OUT}$ is 2 $V_{DD} - V_1 - |V_{thP}|$. For example, if $V_{DD} = 5.0$ V, $V_1 = 1.3$ V, $V_{thP} = -0.7$ V, then the output voltage $V_{OUT}$ is 8.0 V. Note that the voltage $V_1$ is changed by changing the value of the variable resistor 72', and therefore, the output voltage $V_{OUT}$ can be an arbitrary voltage between $V_{DD}$ and 2 $V_{DD}$.

FIG. 8 is a circuit diagram illustrating a clock signal generating circuit for generating the above-mentioned two clock signals. Note that the clock signal generating circuit of FIG. 8 associated with the charge pump circuit of FIGS. 2A, 2B, 2C, 2D, 4A, 4B, 4C, or 4D, can be integrated into a single semiconductor chip, and since this clock signal generating circuit is a complementary MOS (broadly, CMIS) circuit powered by the output voltage $V_{OUT}$ of the charge pump circuit, such a single semiconductor chip can be operated under a single power supply voltage $V_{DD}$.

In FIG. 8, reference numerals 81 and 82 designate P-channel enhancement type MOS transistors which are cross-coupled, i.e., a gate of one is connected to a drain of the other. The sources of the P-channel MOS transistors 81 and 82 are connected to the output terminal OUT. Also, reference numbers 83 and 84 designate N-channel enhancement type MOS transistors each having a drain connected to a drain of one of the P-channel MOS transistors 81 and 82 and a source connected to the ground terminal. A gate of the N-channel MOS transistor 83 receives an external clock signal CLK via an inverter 85 which is formed by a CMOS circuit or an N-channel MOS transistor circuit, while a gate of the N-channel MOS transistor 84 receives the external clock signal CLK directly.

The external clock signal CLK is changed as shown in FIG. 9A, and in this case, the high level of the external clock signal CLK is relatively low, for example, 3 V or 5 V. When the external clock signal CLK is low, the N-channel MOS transistors 83 and 84 are turned ON and OFF, respectively, and therefore, the clock signals $\phi_1$ and $\phi_2$ are low and high, respectively, as shown in FIGS. 9B and 9C. Next, when the external clock signal CLK becomes high, the N-channel MOS transistors 83 and 84 are turned OFF and ON, respectively. In this case, since the driving power of the N-channel MOS transistor 84 is made relatively large, the clock signal $\phi_2$ rapidly becomes low. Then, after a delay time period $\tau$ determined by a gate capacity of the P-channel MOS transistors 81 and an on-resistance value of the N-channel MOS transistor 84 has passed, the P-channel MOS transistor 81 is turned ON to make the clock signal $\phi_1$ high. Next, similarly, when the external clock signal CLK becomes low, the N-channel MOS transistors 83 and 84 are turned ON and OFF, respectively. In this case, since the driving power of the N-channel MOS transistor 83 is made relatively large, the clock signal $\phi_1$ rapidly becomes low. Then, after a delay time period $\tau$ determined by a gate capacity of the P-channel MOS transistor 82 and an on-resistance value of the N-channel MOS transistor 83 has passed, the P-channel MOS transistors 82 is turned ON to make the clock signal $\phi_2$ high.

As explained above, in FIG. 8, the driving power of the N-channel transistors 83 and 84 is made large, in this case, larger than that of the P-channel MOS transistors 81 and 82, to thereby ensure that one of the clock signals $\phi_1$ and $\phi_2$ rises after the other falls. For example, when the external clock signal CLK becomes high to turn ON the N-channel MOS transistor 84, a drain current thereof has to be larger than that of the P-channel MOS transistor 82 to make sure the clock signal $\phi_2$ goes low during the above-mentioned delay time period where the P-channel MOS transistor 82 remain conductive. In this case, if the amplitude of the external clock signal CLK is 3 V and the output voltage $V_{OUT}$ is 8 V, the gate voltage of the N-channel MOS transistor 84 is 3 V and the gate voltage of the P-channel MOS transistor 82 is 8 V, and therefore, is about twice 3 V. Since the driving power of a MOS transistor is generally proportional to the square of the gate voltage applied thereto, the value W/L of the N-channel MOS transistors 83 and 84 are made larger than four times that of the P-channel MOS transistors 81 and 82. Note that W designates a gate width and L designates a gate length.

Figure 10:
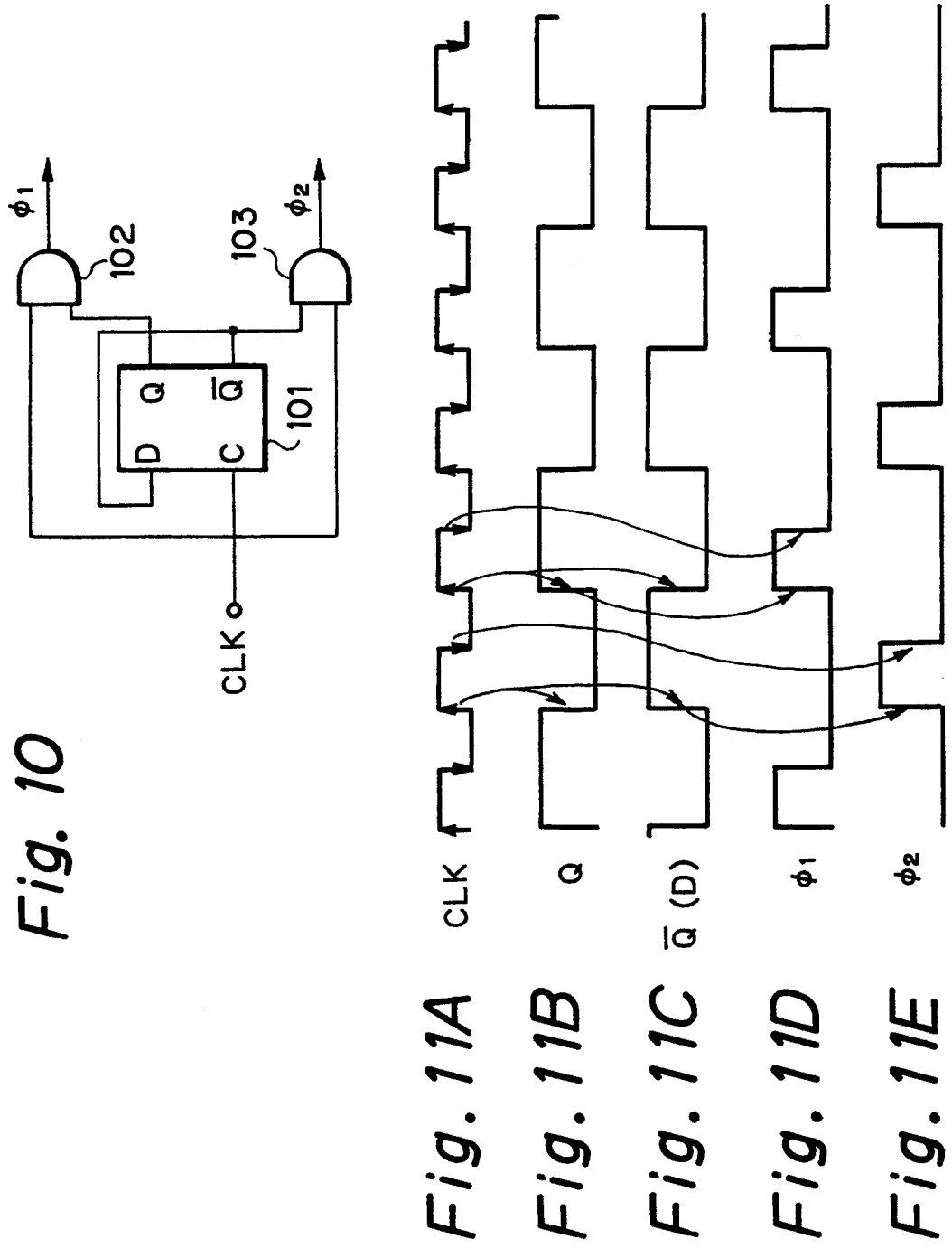
FIG. 10 is a circuit diagram illustrating another clock generating circuit applied to the charge pump circuits of FIGS. 2A through 2D and FIGS. 4A through 4D.

In FIG. 10, which illustrates another clock signal generating circuit for generating the two clock signals $\phi_1$ and $\phi_2$, reference numeral 101 designates a D-type flip-flop which is clocked by a rise of the external clock signal CLK. One output, such as Q of the flip-flop 101, is supplied to an input of an AND circuit 102, while its other input receives the external clock signal CLK, to thereby generate the clock signal $\phi_1$. Similarly, another output, such as $\overline{Q}$ of the flip-flop 101, is supplied to an input of an AND circuit 103, while its other input receives the external clock signal CLK, to thereby generate the clock signal $\phi_2$. Supplied to a data input of the flip-flop 101 is one of the outputs such as $\overline{Q}$ thereof. The D-type flip-flop 101 and the AND circuits 102 and 103 are powered by the output voltage $V_{OUT}$ of the charge pump circuit of FIGS. 2A, 2B, 2C, 2D, 4A, 4B, 4C, or 4D. Therefore, the clock signal generating circuit of FIG. 10 associated with the charge pump circuit can be integrated into a single semiconductor chip, and such a single semiconductor chip can be operated under a single power supply voltage $V_{DD}$.

The external clock signal CLK is changed as shown in FIG. 11A, and also, the high level of the external clock signal CLK is relatively low, for example, 3 V or 5 V. Assuming that the outputs $\overline{Q}$ and Q of the flip-flop 101 are high and low, as shown in FIGS. 11B and 11C, when the external clock signal CLK rises, due to the high level of the data input D, the outputs $\overline{Q}$ and Q are made low and high, respectively, as shown in FIGS. 11A, 11B, and 11C. Also, due to the rise of the output Q, the AND circuit 103 is enabled to make the clock signal $\phi_2$ high, as shown in FIG. 11E. Thereafter, when the external clock signal CLK falls, the AND circuit 103 is disabled to make the clock signal $\phi_2$ low. Similarly, next, when the external clock signal CLK rises, due to the low level of the data input D, the output $\overline{Q}$ and Q are made high and low, respectively, as shown in FIGS. 11A, 11B and 11C. Also, due to the fall of the output Q, the AND circuit 102 is enabled to make the clock signal $\phi_1$ high, as shown in FIG. 11D. Thereafter, when the external clock signal CLK falls, the AND circuit 102 is disabled to make the clock signal $\phi_1$ low.

Thus, in the clock signal generating circuit as illustrated in FIGS. 8 or 10, the two clock signals $\phi_1$ and $\phi_2$, whose high levels are not superposed onto each other, can be obtained.

In the above-mentioned embodiments, each of the switches 2, 4, and 5 can be formed by a P-channel enhancement type MOS transistor, and the switch 3 can be formed by an N-channel enhancement type MOS transistor. Also, in the circuit of FIGS. 8 and 10, a circuit for generating the clock signal CLK can be incorporated into a single semiconductor chip which includes the charge pump circuit and the clock signal generating circuit.

As explained hereinbefore, according to the present invention, since an additional circuit such as an operational amplifier requiring a large power is not provided, the charge pump circuit for generating an intermediate voltage between the power supply voltage $V_{DD}$ and its double voltage $2V_{DD}$ can be reduced in power consumption.

I claim:

1. A charge pump circuit comprising:

first and second power supply terminals;

an output terminal;

first and second switch means connected to said first and second power supply terminals, respectively;

a charge supplying capacitor having a first terminal connected via said first switch means to said first power supply terminal and a second terminal connected via said second switch means to said second power supply terminal;

a constant-voltage means interposed in a circuit formed by said first and second switch means and said charge supplying capacitor between said first and second power supply terminals;

a third switch means connected between said first power supply terminal and the second terminal of said charge supplying capacitor;

a fourth switch means connected between the first terminal of said charge supplying capacitor and said output terminal; and a smoothing capacitor serially connected between one of said first and second power supply terminals and said output terminal, whereby closing of said first and second switch means and opening of said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means is interposed between said first switch means and the first terminal of said charge supplying capacitor.

2. A charge pump circuit comprising:

first and second power supply terminals;

an output terminal;

first and second switch means connected to said first and second power supply terminals, respectively;

a charge supplying capacitor having a first terminal connected via said first switch means to said first power supply terminal and a second terminal connected via said second switch means to said second power supply a constant-voltage means interposed in a circuit formed by said first and second switch means and said charge supplying capacitor between said first and second power supply terminals;

a third switch means connected between said first power supply terminal and the second terminal of said charge supplying capacitor;

a fourth switch means connected between the first terminal of said charge supplying capacitor and said output terminal; and a smoothing capacitor serially connected between one of said first and second power supply terminals and said output terminal, wherein closing of said first and second switch means and opening of said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means is interposed between said first power supply terminal and said first switch means.

3. A circuit as set forth in claim 2, wherein said constant voltage means comprises one or more serially-connected diodes.

4. A circuit as set forth in claim 3, wherein each of said diodes comprises a PN junction diode.

5. A charge pump circuit comprising:

first and second power supply terminals;

an output terminal;

first and second switch means connected to said first and second power supply terminals, respectively;

a charge supplying capacitor having a first terminal connected via said first switching means to said first power supply terminal and a second terminal connected via said second switch means to said second power supply terminal;

a constant-voltage means interposed in a circuit formed by said first and second switch means and said charge supplying capacitor between said first and second power supply terminals;

a third switch means connected between said first power supply terminal and the second terminal of said charge supplying capacitor;

a fourth switch means connected between the first terminal of said charge supplying capacitor and said output terminal; and a smoothing capacitor serially connected between one of said first and second power supply terminals and said output terminals, whereby closing of said first and second switch means and opening of said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means is interposed between said second switch means and said second power supply terminal.

6. A semiconductor integrated circuit for generating an intermediate voltage between a power supply voltage and a ground voltage, comprising:

a ground terminal for receiving the ground voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively, whereby closing of said first and second switch means and opening of said third and fourth switch means by an active state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said clock signal generating circuit comprises a CMIS level shift circuit.

7. A circuit as set forth in claim 6, wherein the power supply voltage is positive, and said CMIS level shift circuit comprises:

two cross-coupled P-channel enhancement type MIS transistors each having a source connected to said output terminal and a drain for generating one of the first and second clock signals;

two N-channel enhancement type MIS transistors each having a drain connected to the drain of a source connected to said ground terminal; a driving power of said N-channel enhancement type MIS transistors one of said P-channel enhancement type MIS transistors and being larger than that of said P-channel enhancement type MIS transistors; and an inverter;

a gate of one of said N-channel enhancement type MIS transistors receiving a reference clock signal directly, a gate of the other receiving the reference clock signal via said inverter.

8. A charge pump comprising:

first and second power supply terminals;

an output terminal;

first and second switch means connected to said first and second power supply terminals, respectively;

a charge supplying capacitor having a first terminal connected via said first switch means to said first power supply terminal and a second terminal connected via said second switch means to said second power supply terminal;

a constant-voltage means interposed in a circuit formed by said first and second switch means and said charge supplying capacitor between said first and second power supply terminals;

a third switch means connected between said first power supply terminal and the second terminal of said charge supplying capacitor;

a fourth switch means connected between the first terminal of said charge supplying capacitor and said output terminal; and a smoothing capacitor serially connected between one of said first and second power supply terminals and said output terminal, whereby closing of said first and second switch means and opening of said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means comprises one or more serially-connected diodes, and wherein each of said didoes comprises a schottky diode.

9. A charge pump circuit comprising:

first and second power supply terminals;

an output terminal;

first and second switch means connected to said first and second power supply terminals, respectively;

a charge supplying capacitor having a first terminal connected via said first switch means to said first power supply terminal and a second terminal connected via said second switch means to said second power supply terminal;

a constant-voltage means interposed in a circuit formed by said first and second switch means and said charge supplying capacitor between said first and second power supply terminals;

a third switch means connected between said first power supplying terminal and the second terminal of said charge supplying capacitor;

a fourth switch means connected between the first terminal of said charge supplying capacitor and said output terminal; and a smoothing capacitor serially connected between one of said first and second power supply terminals and said output terminal, whereby closing of said first and second switch means and opening of a said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means comprises one or more gate-drain-connected enhancement type MIS transistors.

10. A circuit as set forth in claim 9, wherein said MIS transistors are of an N-channel conduction type.

11. A circuit as set forth in claim 9, wherein said MIS transistors are of a P-channel conduction type.

12. A charge pump circuit comprising:

first and second power supply terminals;

an output terminal;

first and second switch means connected to said first and second power supply terminals, respectively;

a charge supplying capacitor having a first terminal connected via said first switch means to said first power supply terminal and a second terminal connected via said second switch means to said second power supply terminal;

a constant-voltage means interposed in a circuit formed by said first and second switch means and said charge supplying capacitor between said first and second power supply terminals;

a third switch means connected between said first power supply terminal and the second terminal of said charge supplying capacitor;

a fourth switch means connected between the first terminal of said charge supplying capacitor and said output terminal; and a smoothing capacitor serially connected between one of said first and second power supply terminals and said output terminal, whereby closing of said first and second switch means and opening of said third and fourth switch means generates a voltage across said charge supplying capacitor and subsequently, opening of said first and second switch means and closing of said third and fourth switch means transfers the voltage across said charge supplying capacitor plus a voltage at said first terminal to said output terminal, wherein said constant voltage means comprises:

a source follower formed by an enhancement-type MIS transistor; and a constant voltage generating means, connected to said source follower, for generating a constant voltage and applying it thereto.

13. A circuit as set forth in claim 12, wherein said constant voltage generating means comprises a voltage divider formed by a series of resistors between said first and second power supply terminals.

14. A semiconductor integrated circuit for generating an intermediate voltage between a power supply voltage and a ground voltage, comprising:

a ground terminal for receiving the ground voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively, whereby closing of said first and second switch means and opening of said third and fourth switch means by an active state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said clock signal generating circuit comprises:

a D-type flip-flop powered by the power supply voltage and the ground voltage, having a data input connected to one of two outputs thereof, and a clock input for receiving an external clock signal;

a first AND circuit, powered by the power supply voltage and the ground voltage, having two inputs for receiving the external clock signal and one of the two outputs of said D-type flip-flop, to generate the first clock signal; and a second AND circuit, powered by the power supply voltage and the ground voltage, having two inputs for recieving the external clock signal and the other of the two inputs of said D-type flip-flop, to generate the second clock signal.

15. A semiconductor integrated circuit for generating an intermediate voltage between a power supply voltage and a ground voltage, comprising:

a ground terminal for receiving the ground voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively, whereby closing of said first and second switch means and opening of said third and fourth switch means by an inactive state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein each of said first, second, third, and fourth switch means comprises an N-channel enhancement type MIS transistor, and said clock signal generating circuit comprises CMIS transistors.

16. A semiconductor integrated circuit for generating an intermediate voltage between a power supply voltage and a ground voltage, comprising:
- a ground terminal for receiving the ground voltage;
- a power supply terminal for receiving the power supply voltage;
- an output terminal;
- first and second switch means connected to said power supply terminal and said ground terminal, respectively;
- a charge supplying capacitor having a first terminal connected via said first switch means to said power supply terminal and a second terminal connected via said second switch means to said ground terminal;
- a constant-voltage means interposed in a circuit formed by said first and second switch means and said charge supply capacitor between said power supply terminal and said ground terminal;
- a third switch means connected between said power supply terminal and the second terminal of said charge supplying capacitor;
- a fourth switch means connected between the first terminal of said charge supplying capacitor and said output terminal;
- a smoothing capacitor serially connected between one of said power supply terminal and said ground terminal, and said output terminal;
- a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively,
- whereby closing of said first and second switch means and opening of said third and fourth switch means by an inactive state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means is interposed between said power supply terminal and said first switch means.

17. A semiconductor integrated circuit for generating an intermediate voltage between a power supply voltage and a ground voltage, comprising:
- a ground material for receiving the ground voltage;
- a power supply terminal for receiving the power supply voltage;
- an output terminal;
- first and second switch means connected to said power supply terminal and said ground terminal, respectively;
- a charge supplying capacitor having a first terminal connected via said first switch means to said power supply terminal and a second terminal connected via said second switch means to said ground terminal;
- a constant-voltage means interposed in a circuit formed by said first and second switch means and said charge supplying capacitor between said power supply terminal and said ground terminal;
- a third switch means connected between said power supply terminal and the second terminal of said charge supplying capacitor;
- a fourth switch means connected between the first terminal of said charge supplying capacitor and said output terminal;
- a smoothing capacitor serially connected between one of said power supply terminal and said ground terminal, and said output terminal;
- a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively,
- whereby closing of said first and second switch means and opening of said third and fourth switch means by an inactive state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means is interposed between said first switch means and the first terminal of said charge supplying capacitor.

18. A semiconductor integrated circuit for generating an intermediate voltage between a power supply voltage and a ground voltage, comprising:
- a ground terminal for receiving the ground voltage;
- a power supply terminal for receiving the power supply voltage;
- an output terminal;
- first and second switch means connected to said power supply terminal and said ground terminal, respectively;
- a charge supplying capacitor having a first terminal connected via said first switch means to said power supply terminal and a second terminal connected via said second switch means to said ground terminal;
- a constant-voltage means interposed in a circuit formed by said first and second switch means and said charge supplying capacitor between said power supply terminal and said ground terminal;
- a third switch means connected between said power supply terminal and the second terminal of said charge supplying capacitor;
- a fourth switch means connected between the first terminal of said charge supplying capacitor and said output terminal;
- a smoothing capacitor serially connected between one of said power supply terminal and said ground terminal, and said output terminal;
- a clock signal generating circuit, connected to said ground terminal and to said output terminal, for generating a first clock signal for closing said first and second switch means and generating a second clock signal for closing said third and fourth switch means, said first and second clocks signals being active when said second and first clock signals are inactive, respectively, whereby closing of said first and second switch means and opening of said third and fourth switch means by an active state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means comprises one or more serially connected diodes, and wherein each of said diodes comprises a schottky diode.

19. A semiconductor integrated circuit for generating an intermediate voltage between a power supply voltage and a ground voltage, comprising:

a ground terminal for recieving the ground voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being inactive when said second and first clock signals are inactive, respectively, whereby closing of said first and second switch means and opening of said third and fourth switch means by an inactive state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means is interposed between said second switch means and said ground terminal.

20. A semiconductor integrated circuit for generating an intermediate voltage between a power supply voltage and a ground voltage, comprising:

a ground terminal for recieving the ground voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively, whereby closing of said first and second switch means and opening of said third and fourth switch means by an active state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means comprises:

a source follower formed by an enhancement type MIS transistor; and a constant voltage generating means, connected to said source follower, for generating a constant voltage and applying it thereto.

21. A circuit set forth in claim 20, wherein said constant voltage generating means comprises a voltage divider formed by a series of resistors between said power supply terminal and said ground terminal.

22. A semiconductor integrated circuit for generating an intermediate voltage between a power supply voltage and a ground voltage, comprising:

a ground terminal for receiving the power supply voltage;

a power supply terminal for receiving the power supply voltage;

an output terminal;

first and second switch means connected to said power supply terminal and said ground terminal, respectively;

a charge supplying capacitor having a first terminal connected via said first switch means to said power supply terminal and a second terminal connected via said second switch means to said ground terminal;

a constant-voltage means interposed in a circuit formed by said first and second switch means and said charge supplying capacitor between said power supply terminal and said ground terminal;

a third switch means connected between said power supply terminal and the second terminal of said charge supplying capacitor;

a fourth switch means connected between the first terminal of said charge supplying capacitor and said output terminal;

a smoothing capacitor serially connected between one of said power supply terminal and said ground terminal, and said output terminal;

a clock signal generating circuit, connected to said ground terminal and to said output terminal, for generating a first clock signal for closing said first and second switch means and generating a second clock signal for closing said third and fourth switch means, said first and second clock signals being active when said second and first clock signals are inactive, respectively, whereby closing of said first and second switch means and opening of said third and fourth switch means by an active state of said second clock signal generates a voltage across said charge supplying capacitor and subsequently, opening of said first and second switch means by an inactive state of said first clock signal and closing of said third and fourth switch means by an active state of said first clock signal transfers the voltage across said charge supplying capacitor plus a voltage at said power supply terminal to said output terminal, wherein said constant voltage means comprises one or more gate-drain-connected enhancement type MIS transistors.

23. A circuit as set forth in claim 22, wherein said MIS transistors are of an P-channel conduction type.

24. A circuit as set forth in claim 22, wherein said MIS transistors are of an N-channel conduction type.

* * * * *